Figure 10:
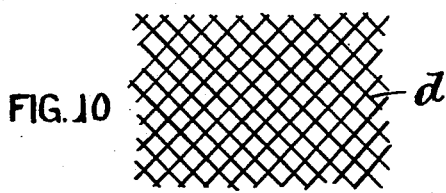

Jan. 3, 1928.  1,654,666
F. A. ROSS
ANTIDAZZLE DEVICE
Filed Sept. 27, 1926  2 Sheets-Sheet 1
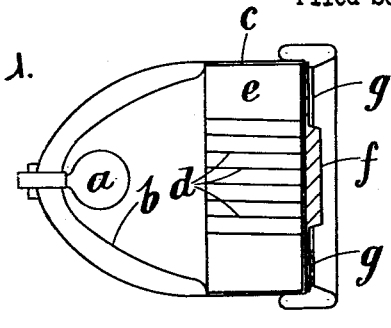
FIG. 1.
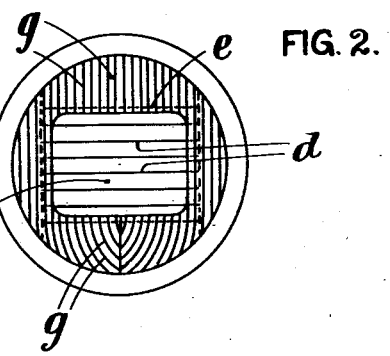
FIG. 2.
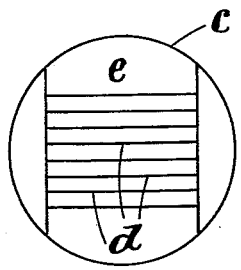
FIG. 3.
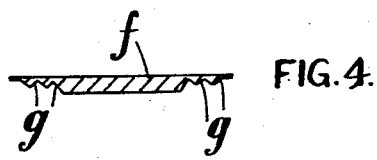
FIG. 4.
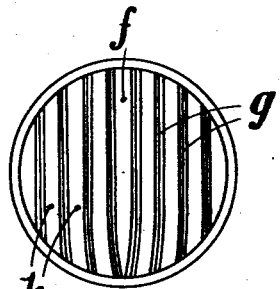
FIG. 5.
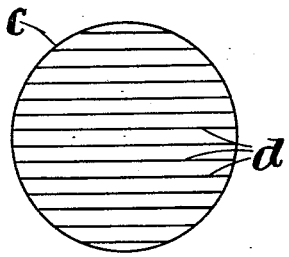
FIG. 7.
FIG. 6.
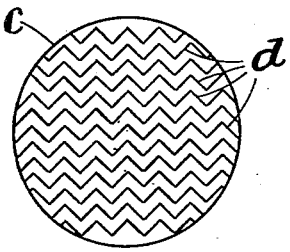
FIG. 8.
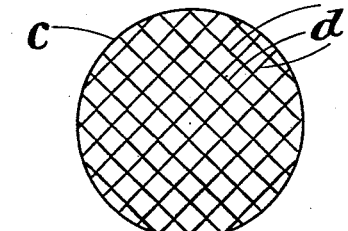
FIG. 9.
Inventor
Frederick A. Ross
Toulmin & Toulmin
Attorneys.

Jan. 3, 1928. 1,654,666
F. A. ROSS
ANTIDAZZLE DEVICE
Filed Sept. 27, 1926 2 Sheets-Sheet 2

Inventor
Frederick A. Ross
Toulmin & Toulmin
Attorneys.

Patented Jan. 3, 1928.

1,654,666

UNITED STATES PATENT OFFICE.

FREDERICK ALEXANDER ROSS, OF WHITLEY BAY, ENGLAND.

ANTIDAZZLE DEVICE.

Application filed September 27, 1926, Serial No. 137,872, and in Great Britain October 1, 1925.

This invention relates to anti-dazzle devices especially intended for application to motor car headlights, and has for its object to provide an improved device which will give maximum protection of light and illumination directly in front of the headlight without dazzling the eyes of approaching drivers, cyclists and pedestrians and will also illuminate the sides of the road along which the car is travelling.

An anti-dazzle device in accordance with my invention comprises a combination of two sets of elements disposed in close association in the front of the usual parabolic or similar reflector and lamp constituting the headlight, and the invention is characterized in that the main beam of light from the reflector is broken up and sub-divided by substantially horizontal and vertical elements, the substantially horizontal elements confining at least the centrally projected portion of the main beam of light to substantially horizontal planes and the other set of elements refracting principally the circumferential portion of said beam in lateral directions, said second set of elements being disposed so that the direction of the centrally projected portion of the beam is substantially unaltered thereby. The set of elements for sub-dividing the beam in substantially horizontal planes comprises thin transversely extending members of substantial depth set edgewise to the reflector and lamp of the headlight, for the purpose of directing upwardly reflecting rays forward in substantially horizontal planes, said members including strips, tubes, concentric cylinders, truncated cones and spirals of imperforate material, opaque or translucent, or of perforated material, wire gauze or metallic fabric. When tubes are used, they may be of circular, oval, rectangular or other convenient section, and may be constituted by a combination of two sets of transverse strips disposed in angular relationship to form a cellular structure of substantial depth, or by corrugated transverse strips assembled so that their ridges abut. Or the tubes may be formed by a series of holes through a thick glass disc. The set of elements for laterally deflecting a portion of the beam of light comprises substantially prismatic corrugations (which term includes ribs and grooves with plane or curved faces) integral with a glass disc. The substantially horizontal sub-dividing elements may be arranged immediately behind the laterally deflecting elements or vice versa, and one set may be arranged to lie clear of the other set; for example, the first mentioned set of elements may be supported by a carrier disposed centrally behind the glass disc integral with said second mentioned set of elements, the substantially prismatic corrugations of which extend around but not across the portion of said glass disc which lies in front of said first mentioned set of elements.

The effect of sub-dividing the main beam of light into substantially horizontal and laterally projected rays of light is that the eye of a person advancing towards the headlight is not affected by the main beam nor focussed on the reflector, and consequently no dazzling effect occurs, the light being horizontally projected without diminution along the road in front of the headlight and laterally deflected along the sides of the road, giving in effect a broad band of light which effectively illuminates the road in front of the car.

Figure 11:
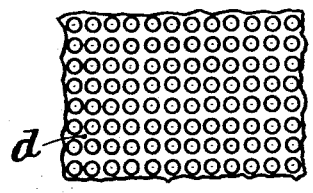
Figure 12:
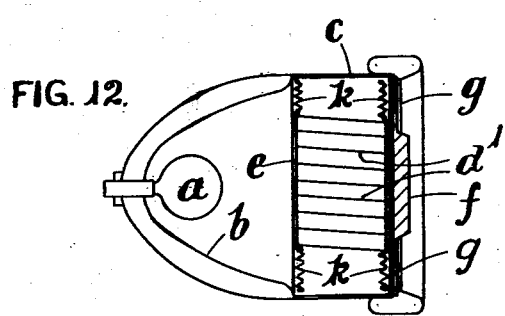

I will proceed to describe my invention with reference to the accompanying drawings wherein Figure 1 is a central longitudinal section of a headlight fitted with an anti-dazzle device in accordance therewith; Figure 2 is a front elevation of Fig. 1; Figure 3 is an elevation of the horizontal sub-dividing elements of Fig. 1; Figure 4 is a cross-section of the laterally deflecting elements of Fig. 1; Figure 5 is an elevation of another form of the laterally deflecting elements, and Figure 6 is a cross-section thereof; Figures 7, 8 and 9 are similar views to Fig. 3 illustrating modifications; Figures 10 and 11 are plan views, to a much enlarged scale, of portions of gauze and perforated material used as horizontal sub-dividing elements; Figures 12, 14 and 16 are similar views to Fig. 1 and Figures 13, 15 and 17 are similar views to Fig. 2 respectively illustrating modified constructions.

Referring to the said drawings, in the construction illustrated in Figs. 1 to 4, $a$ is the lamp, $b$ is the usual parabolic reflector, and $c$ is a cylindrical container which engages with the front end of the reflector $b$. $d$ are horizontal transverse strips disposed in parallel relationship between upright strips $e$ forming a carrier mounted in the central portion of the container $c$, and $f$ is the front glass of the headlight which makes the device weatherproof and is formed with laterally deflecting elements constituted by prismatic corrugations *g* arranged above, below and on each side of the members *d*. The horizontal strips *d* are comparatively deep, their depth being, in the example illustrated, approximately three sevenths of the diameter of the container *c*, but this depth may be varied to suit the relative position of the strips and reflector. They are shown as being slightly tilted, their front edges being lower than their rear edges. The prismatic corrugations *g* are vertical above and at the sides of the strips *d* and are incurved below said strips, as shown in Fig. 2, to deflect some of the rays of light laterally outwards and downwards.

It will be seen that the strips *d*, while allowing rays of light to be forwardly projected in horizontal parallel paths with little or no diminution of intensity, effectively cut off upwardly reflected rays and prevent them striking the eye of a person directly approaching the headlight, while the prismatic ribs *g* deflect rays of light in lateral and downward directions to illuminate the sides of the road and the road surface in front of the car. The headlight thus gives a forwardly projected horizontal or slightly downwardly inclined beam composed of a number of separate parallel beams, and also projects laterally a certain amount of light, and it does not dazzle a directly approaching driver, cyclist or pedestrian because his eyes are protected by the strips *d* and cannot be focussed on the parabolic reflector *b* at the back of the light. The strips *d* may be of imperforate sheet metal, or may be of gauze as shown in Fig. 10 or of perforated sheet metal as shown in Fig. 11. Where the strips *d* are of gauze or perforated material, the rays which pass in an upward direction through the openings in one strip are subdivided and intercepted by the solid portions or strands in the strips lying immediately above it.

In some cases the strips *d* may extend across the full width of the container *c* as shown in Figs. 7, 8 and 9, the carrier *e* being dispensed with, and, instead of being flat as shown in Figs. 1 and 2, 3 and 7, they may be of corrugated form as shown in Fig. 8, or a cellular structure may be formed by arranging the corrugated strips *d* of Fig. 8 so that their ridges abut as shown in Fig. 9. Where strips *d* as illustrated in Figs. 7, 8 and 9 are used, the front glass *f* may be as illustrated in Figs. 5 and 6 having alternate prismatic corrugations *g* and plane portions *h*.

Figure 13:
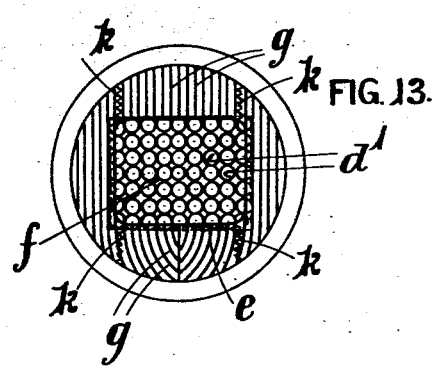
Figure 14:
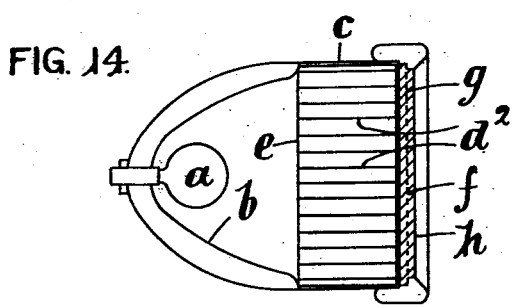

In place of the strips *d* of Figs. 1, 2, 3, 7, 8 and 9, I may, as illustrated in Figs. 12 and 13, employ tubes $d^1$ similarly arranged in combination with prismatic corrugations *g* on the front glass *f*.

Figure 15:
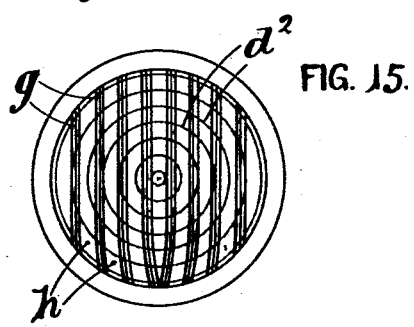
Figure 16:
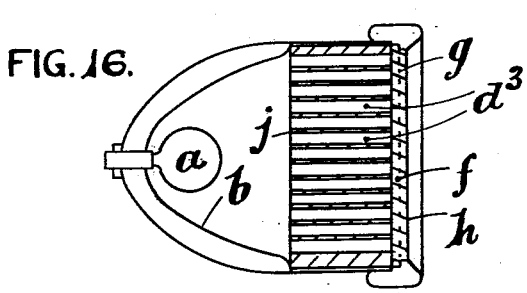
Figure 17:
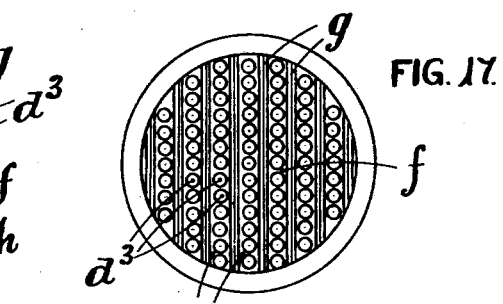

Or, as illustrated in Figs. 14 and 15, I may employ concentric cylinders $d^2$ in place of the strips *d* in combination with the laterally diffusing elements illustrated in Figs. 5 and 6. Or, as shown in Figs. 16 and 17, the horizontal sub-dividing elements may comprise a series of parallel holes $d^3$ in a thick glass disc *j* mounted in front of the reflector *b* and made separately to, or integral with, the prismatically corrugated front glass *f*.

If desired, the strips *d*, tubes $d^1$ or cylinders $d^2$ may be given an oscillatory movement by attaching the upright strips *e* to the inside of the container *c* by spiral springs *k* as shown in Figs. 12 and 13 so that the horizontal sub-dividing elements oscillate with the car on which the headlight is mounted.

What I claim as my invention, and desire to secure by Letters Patent is:—

1. For a headlight, an anti-dazzle device comprising, in combination, two sets of elements in close association, one set of elements sub-dividing the main beam of light in substantially horizontal planes and comprising thin transversely extending members of substantial depth set edgewise to the general direction of said beam, and the other set of elements deflecting a portion of said beam in lateral directions and comprising substantially prismatic corrugations integral with a glass disc, said first mentioned set of elements being supported by a carrier disposed centrally behind the glass disc integral with said second mentioned set of elements, the substantially prismatic corrugations of said glass disc extending around but not across that portion of the disc which lies in front of said first mentioned set of elements.

2. For a headlight, an anti-dazzle device comprising, in combination, two sets of elements in close association, one set of elements sub-dividing the main beam of light in substantially horizontal planes and comprising thin transversely extending members of substantial depth set edgewise to the general direction of said beam, and the other set of elements deflecting a portion of said beam in lateral directions and comprising substantially prismatic corrugations integral with a glass disc, said first mentioned set of elements being supported by a carrier, and means for imparting thereto an oscillatory movement.

3. For a headlight, an anti-dazzle device comprising, in combination, two sets of elements in close association, one set of elements confining at least the centrally projected portion of the beam of light to substantially horizontal planes, and the other set of elements refracting principally the circumferential portions of the beam in lateral directions, said second set of elements being disposed so that the direction of the centrally-projected portion of the beam is substantially unaltered thereby.

4. For a headlight, an anti-dazzle device comprising in combination, two sets of elements in close association, one set of elements being disposed only in the way of the centrally projected portion of the beam of light to confine it to substantially horizontal planes, and the other set of elements being disposed only in the way of the circumferential portion of the beam to refract it in lateral directions.

In testimony whereof, I affix my signature.

FREDERICK A. ROSS.